Feb. 3, 1931.    T. F. STIFFLER    1,790,729

GEAR AND PINION LUBRICATOR

Filed Jan. 19, 1929

WITNESSES
A B Wallace.
F. B. Flick.

INVENTOR
Torrence F. Stiffler
by Brown & Critchlow
his attorneys.

Patented Feb. 3, 1931

1,790,729

UNITED STATES PATENT OFFICE

TORRENCE F. STIFFLER, OF WILKINSBURG, PENNSYLVANIA, ASSIGNOR, BY MESNE ASSIGNMENTS, TO PENNSYLVANIA LUBRICATING COMPANY, OF PITTSBURGH, PENNSYLVANIA, A CORPORATION OF DELAWARE

GEAR AND PINION LUBRICATOR

Application filed January 19, 1929. Serial No. 333,573.

This invention relates to gear lubrication, and especially to lubricators for enclosed gear and pinion assemblies.

Lubrication of gear assemblies requiring a non-liquid lubricant, such as a heavy-bodied grease, has heretofore been unsatisfactory in many instances, especially in the case of street railway car drives comprising a pinion and gear enclosed in a housing. The common practice in such drives is to place sufficient lubricant in the gear housing to cause the bottom of the pinion and gear to run in it, adding lubricant occasionally to replace that used in operation. This practice presupposes that the gears pick up sufficient lubricant in moving through it to afford satisfactory lubrication. However the grease may, and sometimes does, stiffen or harden to such a degree that an insufficient amount is gathered by the gears. For these and other reasons, the drives are frequently not properly lubricated, and trouble and damage may follow.

The object of the invention is to provide means for supplying a non-liquid lubricant in regulated amounts at recurrent intervals to gear assemblies, which is of simple and inexpensive construction, and positive and efficient in action.

An especial object of the invention is to provide means associated with the housing enclosing a drive pinion and gear for supplying a non-liquid lubricant directly to the intermeshed teeth of the gears by gravity flow, and in which the lubricant is intermittently supplied to the gears in small amounts.

Figure 1:
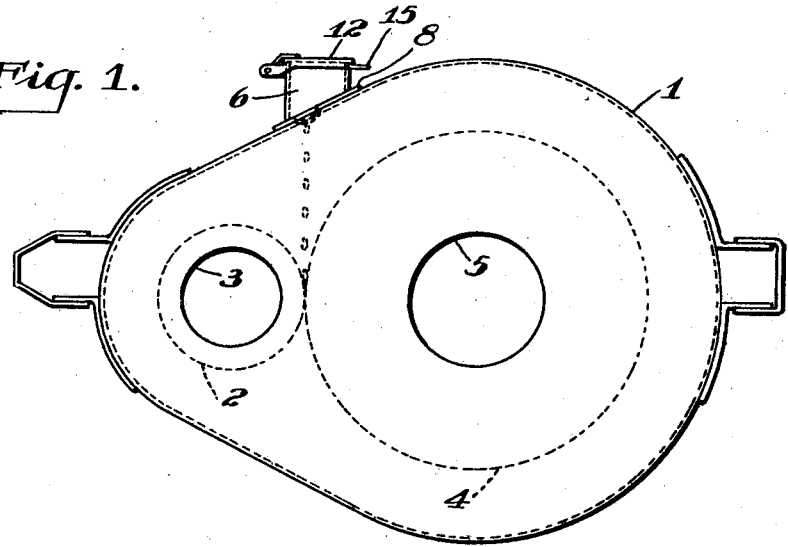
Figure 2:
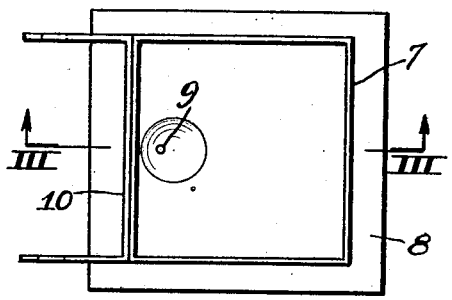
Figure 4:
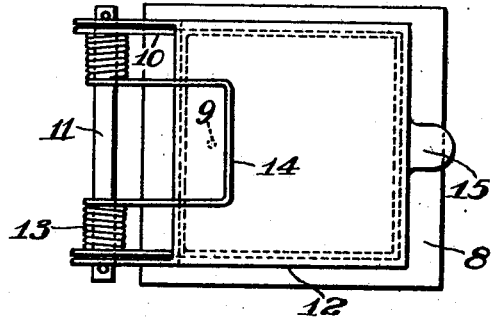
Figure 3:
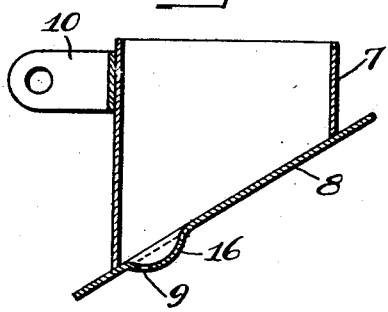
Figure 5:
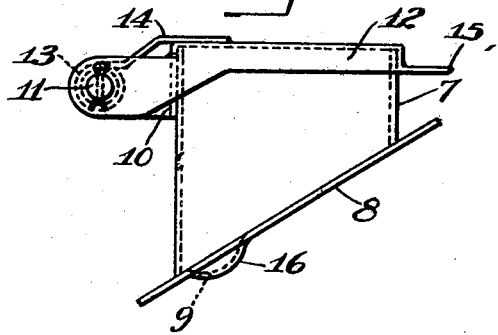

The invention is illustrated in the accompanying drawings in which Fig. 1 is a side elevation of a gear box equipped with a lubricator in accordance with the invention; Fig. 2 is a plan view of the lubricator shell; Fig. 3 is a vertical section through the lubricator shell taken on line III—III, Fig. 2; Fig. 4 is a plan view of an assembled lubricator; and Fig. 5 is an enlarged side elevation of the lubricator shown in Fig. 1.

Although in its broader aspects the invention is applicable generally to gear assemblies, it is particularly adapted for use with gear and pinion drives of the street railway car type referred to, and will be described in its application thereto. Such a drive is shown schematically in Fig. 1, in which a gear box or housing 1 encloses a pinion 2 carried on a motor drive shaft 3 which meshes with a gear 4 mounted on axle 5. This construction is well known in the art.

A non-liquid lubricant is furnished to the gear and pinion from a lubricator adapted to supply the lubricant intermittently in regulated amounts by gravity flow in drop-like form directly to the point where the teeth of the gear and pinion intermesh. This is preferably accomplished by means of a lubricator 6, Fig. 1. Non-liquid but semi-solid greases that have the property of slowly oozing through a small orifice and collecting as a drop beyond it are known and in present use. Such greases will flow very little when cold, but as in the present case, when the gear box warms up in use a normal flow will continue as long as the drive is operating. Sufficient grease will always be on the gears to lubricate the starting period before normal flow of grease commences.

As shown in Figs. 2 to 5, the lubricator comprises a shell 7 which with a base 8 forms a lubricant container. An aperture 9 is formed in the base, through which lubricant flows to the gears. This aperture is adapted to permit slow flow of the lubricant, in a manner to be explained presently. The lubricator is preferably provided with a lid to keep dirt and other foreign material from the grease. To this end, the arms of a U-shaped member 10 attached to the top of one of the side walls form brackets for receiving a shaft 11 on which is pivotally mounted a lid 12, (Figs. 4 and 5) held in closed position by a coil spring 13. The spring shown comprises a length of spring wire coiled at each end, the portion intermediate the ends being bent to form a loop 14 which bears against the top of the lid and holds it shut until the lid is raised by application of pressure to lug 15. The shell, lid, and base are preferably formed from sheet metal. Other forms of spring may, of course be used.

When used with a drive of the type shown in Fig. 1, base 8 of the lubricator is riveted, spot welded, or connected in any other desired manner to the top of the gear box, as shown in Fig. 1, with the shell in an upright position, the aperture being positioned over the opening ordinarily provided in such boxes. This positions the lubricator so that the grease falls between the pinion and gear, as shown in Fig. 1, thereby securing positive application of the grease to the gears. It also positions the lubricator where it is exposed to heat of the gear box in action.

In the use of the lubricator provided by the invention shell 7 is filled with a suitable lubricant such as the heavy semi-solid but non-liquid greases which are however capable of slow flow through an orifice under gravity. Such a lubricant slowly flows out of aperture 9, and when the weight of a drop that has passed through the orifice exceeds the cohesive strength of the lubricant, the drop falls, thus giving a constant but intermittent flow of lubricant to the gears.

The position of the shell 7 on the sloping face of the housing results in a sloping bottom, and the aperture 9 is positioned adjacent its lowermost end, as seen in Fig. 3. The drop-like action is increased further by forming aperture 9 in a spherical depression 16, Fig. 3, struck outwardly from the base. The lubricant flows into this cup-like member whose sloping walls direct it into the aperture and aid the drop formation. The depression is formed toward the lowermost end and centrally of the base. Other variations in construction will be apparent to those skilled in the art.

I claim:

1. The combination with a gear box and gears enclosed therein, of means for applying a non-liquid lubricant in regulated amounts to said gears comprising a lubricant container having side walls and a base provided with an aperture connecting the container and gear box, said aperture being formed to permit intermittent supply of fresh lubricant in small amounts to the gears.

2. The combination with a gear box and gears enclosed therein, of a lubricator for applying a non-liquid lubricant in regulated amount to said gears comprising upright side walls forming a lubricant-containing shell, and a base connected to the shell at an angle to its longitudinal axis and provided adjacent its lowermost end with an aperture connecting the shell and gear box and adapted to permit drop like flow therethrough of fresh lubricant, said base being attached to the upper side of the gear box with its aperture over the gears.

3. The combination with a gear and pinion and a housing enclosing them, of means for positively supplying fresh grease in regulated amounts to the gear and pinion comprising a lubricant container comprised of an upright shell, a base connected to one end of the shell at an angle to its longitudinal axis and provided adjacent its lower end with an aperture connecting the shell and gear box, and a spring-controlled lid connected to the other end of the shell, said base being attached to the top of the housing for gravity flow of the grease through the aperture to the mesh point of the gear and pinion, and said aperture being formed to supply the grease in drop form to the gears.

4. The combination set forth in claim 3, said base plate being provided centrally adjacent its lowermost end with a downwardly projecting depression, and said aperture being formed in said depression.

In testimony whereof, I sign my name.

TORRENCE F. STIFFLER.